B. G. LAMME.
SYSTEM FOR THE OPERATION OF DYNAMO ELECTRIC MACHINES.
APPLICATION FILED MAR. 15, 1906.
977,641.
Patented Dec. 6, 1910.
3 SHEETS—SHEET 2.
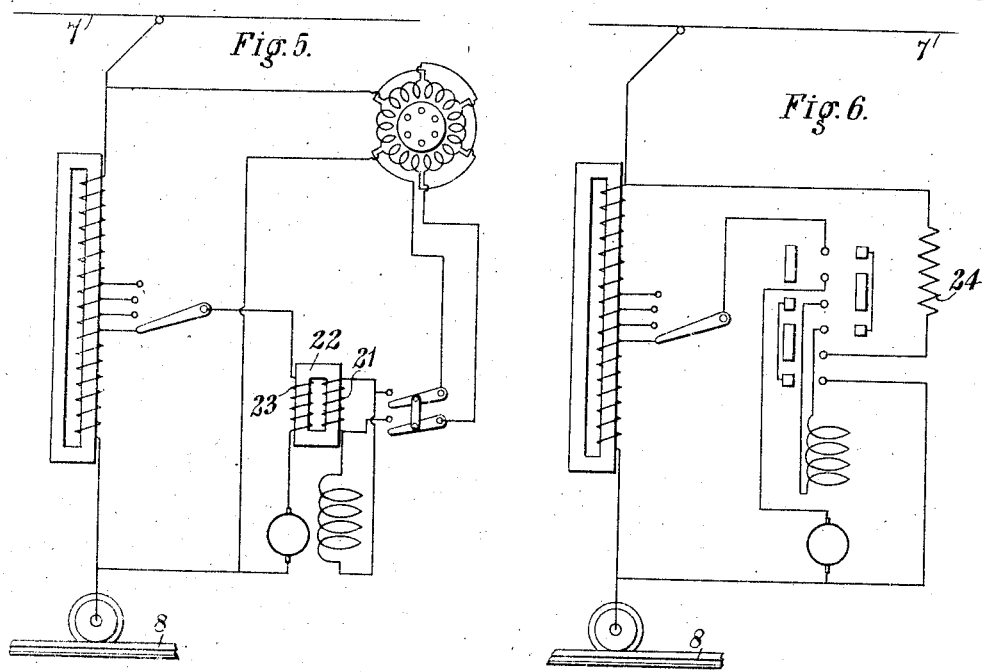
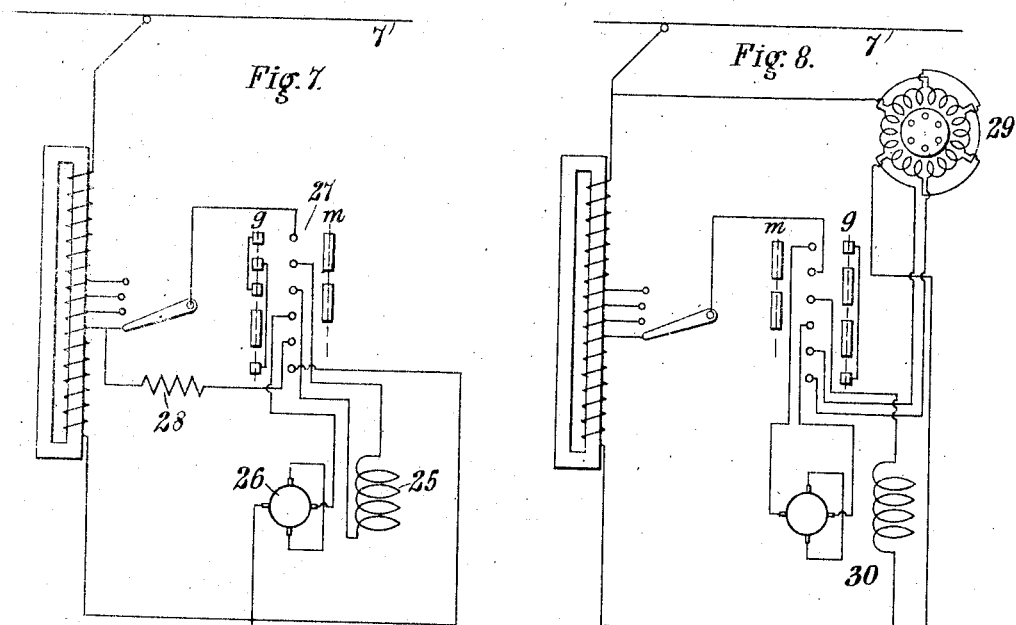
WITNESSES:
C. L. Belcher
Otto S. Schairer
INVENTOR
Benjamin G. Lamme
BY
Kesley S. Carr
ATTORNEY B. G. LAMME.
SYSTEM FOR THE OPERATION OF DYNAMO ELECTRIC MACHINES.
APPLICATION FILED MAR. 15, 1906.
977,641.
Patented Dec. 6, 1910.
3 SHEETS—SHEET 3.
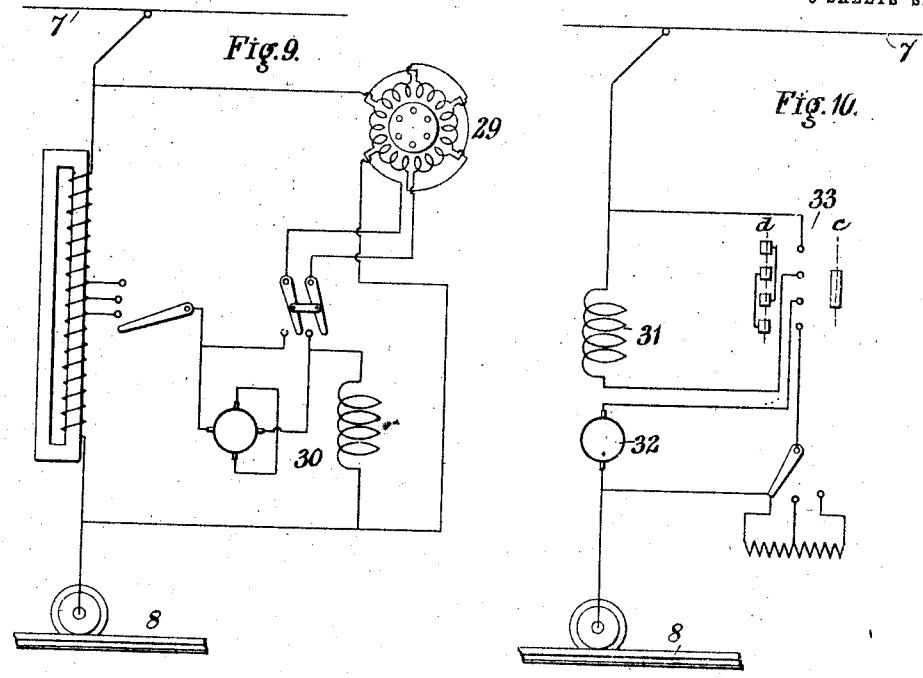
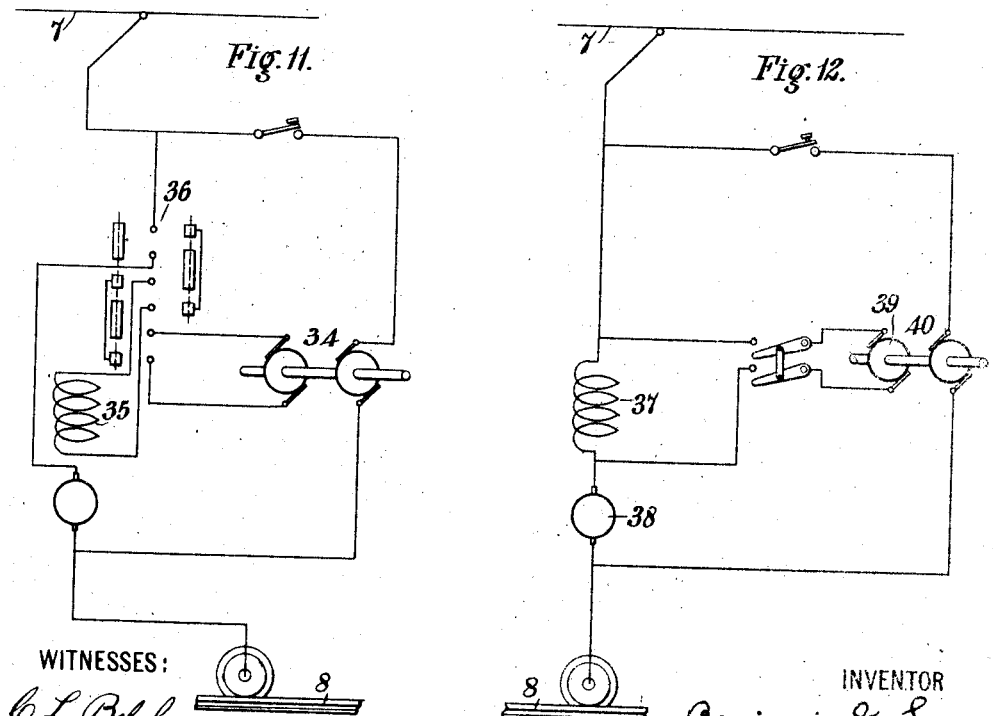
WITNESSES:
C. L. Belcher
Otto S. Schairer
INVENTOR
Benjamin G. Lamme
BY
Wisley G. Carr
ATTORNEY

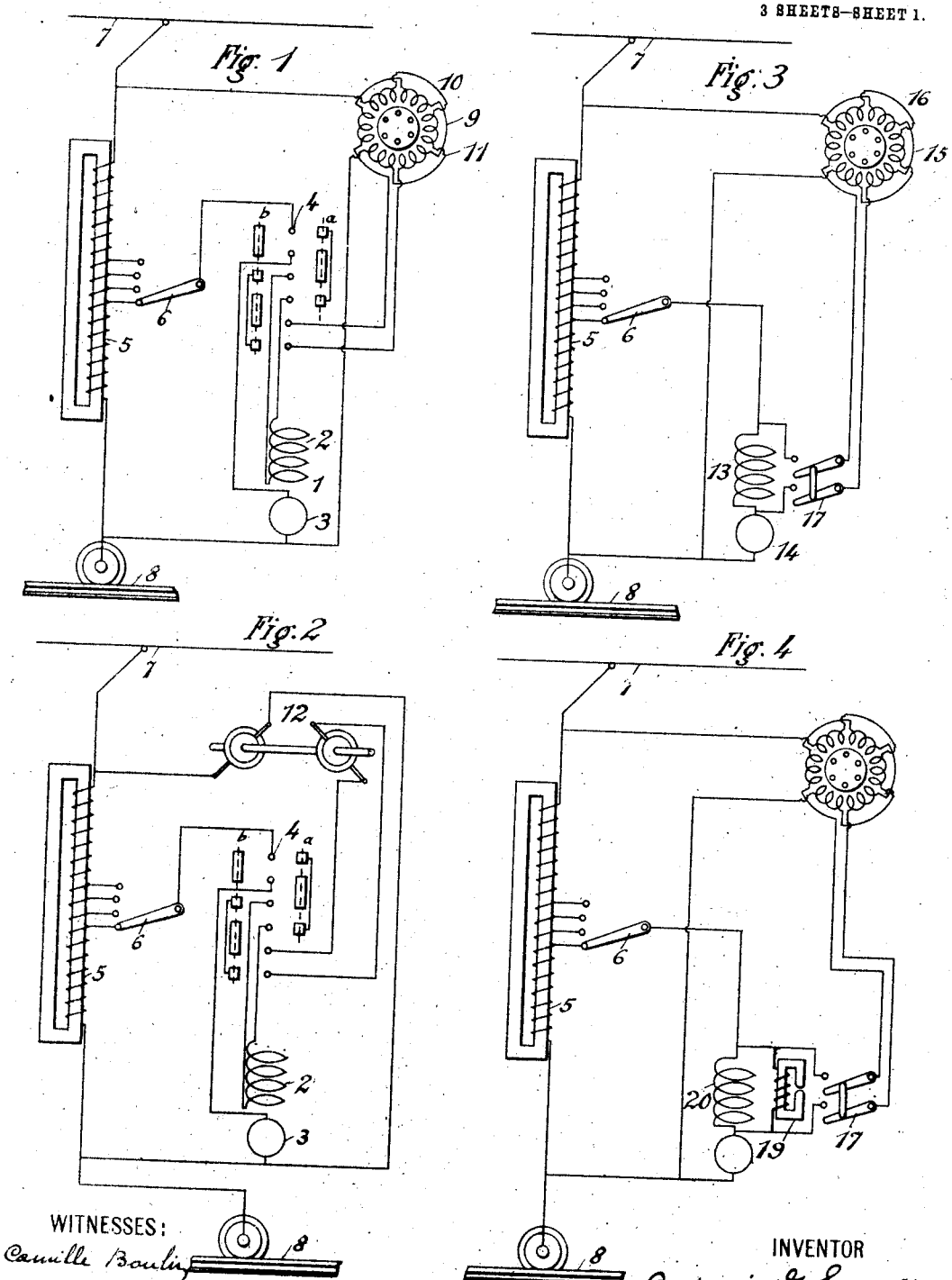

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM FOR THE OPERATION OF DYNAMO-ELECTRIC MACHINES.

977,641.     Specification of Letters Patent.     Patented Dec. 6, 1910.

Application filed March 15, 1906. Serial No. 306,218.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Systems for the Operation of Dynamo - Electric Machines, of which the following is a specification.

My invention relates to dynamo-electric machines and particularly to motors of the commutator type of construction having series-connected field magnet and armature windings.

The object of my invention is to provide a method of and a means for operating motors of the character indicated such that they may be caused to operate as generators, under stable conditions, or under conditions that may be controlled.

Figure 1 of the accompanying drawings is a diagrammatic view, of a system that embodies my invention. Figs. 2, 3, 4 and 5 are modifications of the system shown in Fig. 1, and Figs. 6 to 12 inclusive are diagrammatic views, of systems that embody other modifications of my invention.

In the operation of an electric railway vehicle, it is frequently desirable, as for instance, when the vehicle descends a grade, to cause the propelling motors to operate as generators in order that the kinetic energy of the vehicle may be saved by converting it into electrical energy and supplying it thus to the distributing circuit. Vehicle motors are generally of the commutator type of construction and the field magnet and armature windings thereof are usually connected in series relation. It has been found, under certain conditions, that the current supplied by such motors when operating as generators will increase, and this causes an increase of the field strength. This, in turn, causes the voltage of the generator to increase so that abnormal amounts of power may be supplied to the distributing circuit. Thus a motor may operate as a very powerful dynamic brake rather than as a generator, the operation of which may be controlled. In order that a motor may be caused to operate as a generator under stable conditions, or under conditions that may be governed, it is obviously necessary that the field strength be maintained substantially constant or that it be under control. In another application, Serial No. 306,217, filed of even date herewith, I have claimed broadly, means whereby such conditions of operation may be secured and in the present application, I desire to claim specifically one of the means set forth therein.

In the present embodiment of the invention, the field magnet winding of a motor, when the motor is operating as a generator, has a substantially constant excitation, and it therefore follows that stable conditions of operation will be secured and that the voltage of the generator will vary in proportion to the speed. As in direct current practice, a motor of the commutator type may be caused to operate under stable conditions as a generator of alternating current, if the field magnet winding is separately or constantly excited. If, however, the field magnet winding should be supplied from the same circuit as that to which the armature is connected, the electromotive force of the armature would be considerably out of phase (nearly 90°) with the electromotive force of the circuit, since the field magnet winding is highly inductive and the current therein lags nearly 90° behind the electromotive force. Accordingly, when the motor is operated as a generator, I propose to supply the field magnet winding from a phase changing device that is interposed between the field magnet winding and the circuit to which the armature is connected, the phase changing device being so constructed and arranged as to apply an electromotive force to the field magnet winding of such a phase that the electromotive force of the armature will agree approximately in phase with the electromotive force of the circuit to which the armature is connected.

When a motor 1 (Fig. 1) is operated normally, its field magnet and armature windings 2 and 3, respectively, are adapted to be connected in series relation by the movement of a controller 4 to the position indicated by the broken line *a*. The voltage applied to the motor may be varied by varying the active length of a transformer winding 5 that is included in the motor circuit by any suitable means, such as a switch arm 6, the transformer being supplied from any suitable distributing circuit, such as a trolley conductor 7 and a track rail 8. The controller 4 is adapted to occupy the position indicated by the broken line *b*, when the motor is operated as a generator, the armature being then arranged in circuit as before. The field magnet winding, however, is supplied from a winding 9 of a suitable phase-changing device 10, another winding 11 of which is adapted to be supplied directly from the distributing circuit, or, if desired, it may be supplied from the transformer winding 5. The phase-changing device 10, as illustrated in Fig. 1, is a continuously running machine of the induction motor type, the windings 9 and 11 of which are so disposed with reference to each other that the electromotive force applied to the field magnet winding may be of a phase such that the electromotive force of the armature will agree in phase with that of the transformer 5. It will be understood that the voltage of the motor when operated as a generator will vary as the speed of the vehicle upon which the motor is mounted, and that the motor armature may be connected by means of the switch arm 6 to such point of the transformer winding 5, as corresponds in voltage to that generated by the motor.

Other suitable forms of phase-changing devices may be employed, such, for instance, as a synchronously operated motor-generator 12 (Fig. 2), the generator electromotive force of which is so disposed with reference to the electromotive force applied to the motor that the electromotive force of the motor armature may agree approximately in phase with the electromotive force of the transformer.

It will be readily understood that in the systems of Figs. 1 and 2, the phase-changing device must have sufficient capacity to supply the field magnet windings with all of the current required for their excitation. In order that a smaller phase-changing device may be employed than is necessary in those cases, field magnet and armature windings 13 and 14, respectively, of the motor, (Fig. 3) may be connected permanently in series relation, and winding 15 of phase-changing device 16 may be connected in shunt relation to the field magnet winding by means of a switch 17 when the motor is operated as a generator. The voltage applied to the field magnet winding from the phase-changing device may be adjusted so that it will equal the normal or other predetermined drop of potential in the field magnet winding; that is, under normal conditions of operation of the motor as a generator, the phase-changing device will remain substantially inactive and will not supply current to the field magnet winding nor will it derive current from the motor circuit. However, if the current that traverses the armature falls below the normal value, the deficit of current will be supplied to the field magnet winding by the phase-changing device, and, on the other hand, if the current traversing the motor armature exceeds the normal value, the excess of current will be supplied to the phase-changing device, thus preventing it from traversing the field magnet winding. In this manner, the field strength may be maintained substantially constant.

In the before mentioned application, Serial No. 306,217 I have shown and described means whereby direct current may be prevented from traversing the field magnet winding in order to prevent the motor from automatically becoming a generator of direct current upon reversal of the connections of the field magnet and armature windings with reference to each other while the vehicle is in motion. A like result may be secured as indicated in Fig. 4, in which an impedance device 19 is connected in shunt relation to field magnet winding 20, the ohmic resistance of the device being low, as compared with that of the field magnet winding, and its inductive resistance being high as compared with that of the field magnet winding. It will be understood that, when the circuits are so arranged, if direct current traverses the motor circuits, only a very small portion of it will be permitted to traverse the field magnet winding 20, and the field strength will consequently be insufficient to enable the motor to become a generator of direct current. However, when alternating current traverses the motor circuits very little of it is permitted to traverse the impedance device because of its high inductance. Another means which may be employed for preventing direct current from traversing the field magnet winding is that which is shown in Fig. 5, in which the field magnet winding is supplied from secondary winding 21 of a transformer 22, primary winding 23 of which is connected in series with the armature. Obviously, the mode of operation remains substantially the same and it is immaterial whether the windings be connected directly in series or not, so long as the field magnet winding is supplied with current that is equal or proportional in amount to that which traverses the armature when the machine is operated as a motor.

The armature electromotive force may also be brought more nearly into phase with that of the circuit to which it is connected when the field magnet winding is separately excited from the same circuit, if a sufficiently high ohmic resistance 24 be included in circuit with the field magnet winding, as shown in Fig. 6. With such an arrangement, however, an extremely high resistance will be necessary in order to displace the phase of the current in the field magnet winding sufficiently to effect approximate coincidence of the electromotive forces, since the voltage of the circuit will ordinarily be comparatively high. However, in motors that are known as the repulsion series type in which the field magnetizing current is supplied by additional sets of commutator brushes, the employment of a comparatively small resistance may be permitted because, at synchronous speed, the voltage of the exciting current will be approximately zero.

In Fig. 7, windings 25 and 26, of a repulsion type motor, are adapted to be connected in series relation when the machine is operated as a motor by the movement of controller 27 to the position indicated by broken line $m$, and are adapted to be connected separately to the supply circuit when the machine is operated as a generator by the movement of the controller to the position indicated by the broken line $g$. Under the latter conditions, a resistance 28 is connected in series circuit with the winding 26.

A phase-changing device 29 (Fig. 8) may also be employed for supplying the exciting current to a motor 30 of the repulsion type, in a manner similar to that shown in Figs. 1 and 2. Since the kilo-volt-amperes required for the excitation of such a motor is relatively small, when running near the so-called synchronous speed, the phase-changing device may be of relatively small capacity. However, any material departure from synchronous speed would necessitate a corresponding increase in the capacity of the phase-changing device. If desired, the motor windings may be left connected in series relation when changing from a motor to a generator, it of course being understood that the connections of the windings with reference to each other should be reversed at the same time, and the phase-changing device may be connected as shown in Fig. 9 so as to supply only the excess or deficit of current required to keep the field excitation substantially constant in a manner similar to that described for Fig. 3.

While the invention has been thus far shown and described as applied to alternating current systems, it may also be applied to direct current systems in which it may be desired to operate a motor as a generator under stable conditions. Accordingly, as indicated in Fig. 10, field magnet and armature windings 31 and 32 may be connected in series relation by the movement of a controller 33 to the position indicated by broken line $c$, and the windings be connected directly to the supply circuit by movement of the controller to the position indicated by the broken line $d$ when it is desired to cause the motor to operate as a generator. Thus the field magnet and armature windings are connected in series relation when the machine is operated as a motor, while the field magnet winding is separately excited when the machine is operated as a generator.

In the system illustrated in Fig. 11 a motor-generator 34 is employed for supplying current to field magnet winding 35 when the machine is operated as a generator, the motor-generator being supplied with current for its operation directly from the supply circuit. A controller 36 is employed in the usual manner for connecting the field magnet and armature windings in series relation when the machine is operating as a motor and for connecting the armature directly to the supply circuit and the field magnet winding to the motor-generator when it is operating as a generator. It will generally be desirable, however, to connect field magnet and armature windings 37 and 38 (Fig. 12) directly in series relation and to connect generator 39 of a motor-generator 40 in shunt circuit to the field magnet winding in a manner similar to that shown in the alternating current system of Fig. 3, when the motor is operated as a generator, in order that a motor-generator of comparatively small capacity may be employed.

It will be understood in each case when changing from a motor to a generator that the connections of the motor windings with reference to each other should be changed, but in most of the figures of the drawings such changes have not been indicated because of the complication and confusion of the circuits that might result.

The specific applications of the invention herein shown and described are only illustrative of the manner in which the invention may be employed and I desire to cover broadly all such applications and arrangements of the circuits as do not materially change the mode of operation thereof.

Certain of the specific arrangements herein set forth are claimed in a divisional application, Serial No. 401,323.

I claim as my invention:

1. The combination with a distributing circuit, and a dynamo-electric machine that may be operated either as a motor or as a generator and is provided with field magnet and armature windings that are arranged in series relation when the machine is operated as a motor, of means for separately exciting the field magnet winding, when the machine is operated as a generator, with current that is out of phase with that of the said distributing circuit.

2. The combination with a dynamo-electric machine that may be operated either as a motor or as a generator and is provided with field magnet and armature windings that are arranged in series relation when the machine is operated as a motor, of means for separately exciting the field magnet winding with current of such phase that the electromotive force phase of the armature may approximate the electromotive force phase of the circuit to which it is connected, when the machine is operated as a generator.

3. The combination with a distributing circuit, and a dynamo-electric machine that may be operated either as a motor or as a generator and is provided with field magnet and armature windings that are arranged in series relation when the machine is operated as a motor, of a source of substantially constant electromotive force of different phase from that of the distributing circuit that is connected to the field magnet winding when the machine is operated as a generator.

4. The combination with a distributing circuit, and a dynamo-electric machine that may be operated either as a motor or as a generator and is provided with field magnet and armature windings that are arranged in series relation when the machine is operated as a motor, of means for separately exciting the field magnet winding with current of such phase that the electromotive force phase of the armature may approximate the electromotive force phase of the distributing circuit, when the machine is operated as a generator.

5. The combination with a distributing circuit, and a dynamo-electric machine that may be operated either as a motor or as a generator and is provided with field magnet and armature windings that are arranged in series relation for motor operation, of means for deriving from the distributing circuit, and applying the same to the field magnet winding when the machine is operated as a generator, a current of such phase that the electromotive force generated by the machine will be approximately in phase with that of the distributing circuit.

6. The combination with a distributing circuit, and a dynamo-electric machine that may be operated either as a motor or as a generator and is provided with field magnet and armature windings that are arranged in series relation for motor operation, of means for deriving from the distributing circuit, and applying the same to the field magnet winding when the machine is operated as a generator, a current that is out of phase with that of the distributing circuit.

7. The combination with a distributing circuit, a dynamo-electric machine that may be operated either as a motor or as a generator and is provided with armature and field magnet windings that are arranged in series relation for motor operation, of an auxiliary source of current the electromotive force of which is out of phase with that of the distributing circuit, and means for connecting the armature of the machine to said circuit and the field magnet winding thereof to said auxiliary source of current, for generator operation.

8. The combination with a distributing circuit, a dynamo-electric machine that may be operated either as a motor or as a generator and is provided with armature and field magnet windings that are arranged in series relation for motor operation, of an auxiliary source of current, and means for connecting the armature of the machine to said circuit and the field magnet winding thereof to said auxiliary source of current, for generator operation, the electromotive force of the said auxiliary source being of such phase that the generated electromotive force of the machine may agree approximately in phase with that of the distributing circuit.

9. The method of utilizing an alternating current dynamo-electric machine alternately as a motor and as a generator, which consists in arranging the field magnet and armature windings thereof in series relation for motor operation, and, for generator operation, supplying the field magnet winding thereof with current derived externally to the machine and of such phase that the electromotive force phase of the armature will approximate the electromotive force phase of the circuit to which it is connected.

10. The method of utilizing an alternating current dynamo-electric machine alternately as a motor and as a generator, which consists in arranging the field magnet and armature windings thereof in series relation for motor operation, and, for generator operation, supplying the field magnet winding thereof with current derived externally to the machine and that is out of phase with that of the circuit to which the armature is connected.

11. The method of utilizing an alternating current dynamo-electric machine alternately as a motor and as a generator, which consists in arranging the field magnet and armature windings thereof in series relation for motor operation, and separately exciting the field magnet winding thereof, for generator operation, by a current of such phase that the electromotive force phase of the armature will approximate the electromotive force phase of the circuit to which it is connected.

12. The method of utilizing an alternating current dynamo-electric machine alternately as a motor and as a generator, which consists in arranging the field magnet and armature windings thereof in series relation for motor operation, and separately exciting the field magnet winding thereof, for generator operation, by a current that is out of phase with that of the circuit to which the armature is connected.

13. The method of utilizing an alternating current dynamo-electric machine alternately as a motor and as a generator, which consists in arranging the field magnet and armature windings thereof in series relation for motor operation, and, for generator operation, in deriving a current from the circuit to which the armature is connected, and exciting the field magnet winding of the machine thereby, the said current being derived externally to the machine and being also out of phase with that of the said circuit.

14. The method of utilizing an alternating current dynamo-electric machine alternately as a motor and as a generator, which consists in arranging the field magnet and armature windings thereof in series relation for motor operation, and, for generator operation, in deriving a current from the circuit to which the armature is connected, and exciting the field magnet winding of the machine thereby, the said current being derived externally to the machine and being also of such phase that the electromotive force phase of the armature will approximate the electromotive force phase of the circuit to which it is connected.

15. The method of utilizing an alternating current dynamo-electric machine alternately as a motor and as a generator, which consists in arranging the field magnet and armature windings thereof in series relation for motor operation, and, for generator operation, in deriving from the circuit to which the armature is connected a current that is out of phase with that of the said circuit, and separately exciting the field magnet winding of the machine by the said derived current.

16. The method of utilizing an alternating current dynamo-electric machine alternately as a motor and as a generator, which consists in arranging the field magnet and armature windings thereof in series relation for motor operation, and, for generator operation, in deriving a current from the circuit to which the armature is connected, and separately exciting the field magnet winding of the machine thereby, the said derived current being of such phase that the electromotive force phase of the armature will approximate the electromotive force phase of the circuit to which it is connected.

17. The method of braking an alternating current motor of the commutator type which consists in connecting the armature to the source and impressing on the field of the motor a voltage displaced in phase substantially ninety degrees from the voltage of the source.

18. The method of braking an alternating current motor of the commutator type which consists in connecting the armature to the source, and connecting the field in shunt to the armature through a phase-shifting device adapted to shift the phase of the voltage impressed on the field substantially ninety degrees from the voltage of the source.

19. In combination, an alternating current motor of the commutator type, a source of single-phase current, and means for deriving from said source and impressing on the field for braking a voltage displaced substantially ninety degrees from the voltage of said source.

In testimony whereof, I have hereunto subscribed my name this 13th day of March, 1906.

BENJ. G. LAMME.

Witnesses:
OTTO S. SCHAIRER,
BIRNEY HINES.